United States Patent [19]

Banerjie

[11] Patent Number: 5,030,662
[45] Date of Patent: Jul. 9, 1991

[54] CONSTRUCTION MATERIAL OBTAINED FROM RECYCLED POLYOLEFINS CONTAINING OTHER POLYMERS

[75] Inventor: Asis K. Banerjie, Whippany, N.J.

[73] Assignee: Polymerix, Inc., Lincoln Park, N.J.

[21] Appl. No.: 231,084

[22] Filed: Aug. 11, 1988

[51] Int. Cl.$^5$ .................. C08J 11/00; C08L 23/04; C08L 35/00; C08L 33/02

[52] U.S. Cl. ................... 521/43.5; 521/134; 521/140; 521/91; 521/92; 524/504; 524/522

[58] Field of Search ............... 524/504, 522; 521/43.5, 521/134, 140

[56] References Cited

U.S. PATENT DOCUMENTS

| | | | |
|---|---|---|---|
| 3,957,919 | 5/1976 | von Bodungen | 524/504 |
| 4,397,982 | 8/1983 | Boutni | 524/504 |
| 4,430,468 | 2/1984 | Schumacher | 524/522 |
| 4,446,267 | 5/1984 | Lundberg | 524/502 |
| 4,677,142 | 6/1987 | Solc | 524/505 |
| 4,696,967 | 9/1987 | Shedd | 525/221 |
| 4,822,653 | 4/1989 | Kauffman | 524/505 |

OTHER PUBLICATIONS

A. Spaak, "Use of Secondary Recycled Plastics", a paper presented at the Plastics Institute of America, meeting on Oct. 6–7, 1988 at the Sheraton Hotel, Newark, N.J.

Primary Examiner—C. Warren Ivy
Attorney, Agent, or Firm—Darby & Darby

[57] ABSTRACT

Construction materials prepared from recycled polymeric material containing primarily polyolefins such as high density polyethylene, ultra high molecular weight polyethylene, low density polyethylene, linear low density polyethylene, and polypropylene homopolymers and copolymers are useful for profiled extruded forms such as fence posts, door frames, rails, railway sleepers, and other applications where lumber is conventionally employed. The compositions of the invention contain, in addition to the mixed plastic matrix, reactive compatibilizers, impact modifiers, and reinforcing agents. When desired, foaming agents may also be employed. The recycled mixed plastic materials have been subject to at least one high temperature processing step when used in their original application. Such plastics differ in physical and chemical composition from virgin material.

12 Claims, No Drawings

CONSTRUCTION MATERIAL OBTAINED FROM RECYCLED POLYOLEFINS CONTAINING OTHER POLYMERS

BACKGROUND OF THE INVENTION

On a worldwide basis, polyolefins are consumed in the greatest quantity (approximately 14 billion pounds in the U.S.A.). Applications include packaging for food, milk and detergents, as well as for large volume industrial chemicals, and for the manufacture of toys, caps, wire and cable jacketing, silos, automotive parts and medical supplies. Since these plastics are not biodegradable, disposition presents a major threat to the environment for municipalities and industry.

Though negative in the abovementioned respect, certain waste plastics do have certain inherent strengths. Since they are not biodegradable, they have a life cycle much longer than conventional materials such as wood. In addition, plastics can be tailor-made to improve their chemical, environmental, bacterial, fungal or other biological resistance. Also, their mechanical, electrical or flame-resistant properties can be modified as required for particular applications and a variety of technologies can be used which cannot be used with naturally occurring materials.

Unfortunately, only limited applications for waste plastics have been developed. For example, U.S. Pat. No. 4,003,866 teaches construction material made from thermoplastic resins and fillers, but requires the use of coating or encapsulating the filler in polyethylene or polypropylene wax.

These processes, however, entail a large number of processing steps and the properties of the products are not sufficiently improved to enable the products to be used in many applications.

Also, in U.S. Pat. No. 4,161,465, waste PVC was reconstituted with red mud, but this patent does not address recycling waste polyolefins.

DESCRIPTION OF THE INVENTION

In accordance with this invention, compositions have been developed from waste or recyclable polyolefins which can be readily extruded into structural members and other useful products. Basically, the compositions of the invention comprise:

(a) an essentially polyolefinic polymer matrix;
(b) a compatibilizer or reactive component;
(c) an impact modifier;
(d) a reinforcing agent with or without a coupling agent; and
(e) optionally, a foaming agent.

In addition to extrusion, the compositions of this invention may be injection molded to produce commercially usable products. Other additives can be used, including viscosity stabilizers, processing aids, and coloring agents.

The polyolefins which form not less than 80% by wt. of the matrix of the composition are recycled or waste materials, as opposed to virgin polymers, and include HDPE, LDPE, LLDPE, UHMWPE, polypropylene (homo- and copolymer), and combinations thereof. The major sources of these materials are so-called "clean plastics waste" obtained from municipal, residential or industrial waste. Since these materials have been processed in their initial application or applications and exposed, often for lengthy periods, to the environment, they have markedly different physical and chemical properties from virgin material. Generally, the waste plastics have substantially lower tensile strength and poor flex and thermal properties, as compared to virgin plastics.

The polymer matrix may also contain minor amounts of one or more polymeric materials such as PVC (rigid or flexible), chloro-sulfonated polyethylene, compounded (reinforced) and modified polypropylene, unmodified or compounded (modified-reinforced, alloy, blends) engineering plastics such as polyamides, polycarbonates, thermoplastic polyesters (PET or PBT), ABS, polyphenylene oxide and polyacetals. The polymer matrix may contain up to 20 wt. %, preferably from 0.5 to 15 wt. % of these plastics. They can also be derived from recyclable waste.

The components (b), (c), (d) and (e) above are essential to the composition of the invention. They provide the necessary physical and chemical characteristics, mechanical strength, impact resistance, and density to the final product. Without these additives, the performance properties needed for certain specific applications could not be achieved.

With regard to component (b), the compatibilizer, this must have reactive groups which will react with the polymer matrix under heat and shear during processing by either a free radical or ionic mechanism. This serves to compatibilize the two or more polymers present in the waste material. The following materials are preferred: ethylene-propylene-maleic anhydride copolymer, styrene maleic anhydride copolymer, ethylene-methyl acrylate copolymer, ethylene-ethyl acrylate copolymers, ethylene-acrylic acid copolymer, maleic anhydride ionomers (e.g., surlyn thereof, and reactive polystyrene. The amount of this component may range from about 0.5 to about 10 parts per hundred of the polymer matrix, most preferably from 0.5 to 5 parts per hundred. A combination of compatibilizers can also be used to realize the desired properties in the final product.

A wide variety of impact modifiers, component (c), may be used. These are generally rubbery polymers having a high glass transition temperature. They may be used singly or in combination and can also serve the function of the compatibilizer where they contain reactive groups. The preferred impact modifiers are ionomer resins (surlyn), rubbers such as EPDM or modified EPDM, ethylene vinyl acetate copolymers, ethylene-acrylic acid copolymers, ethylene-methacrylic acid copolymers, ethylene-ethyl acrylate, methacrylic acid terpolymer wherein the methacrylic acid functions are at least partially neutralized, ABS, methyl methacrylate grafted polybutylene, methyl methacrylate-styrene grafted rubbers, styrene butadiene rubber, styrene-butadiene-styrene (S-B-S) block copolymers, acrylic rubbers, ethylene-methyl acrylate copolymers, ethylene-ethylacrylate copolymers, and polycarbonates.

The amounts of impact modifiers generally fall within the range of about 5 to about 25 parts per hundred parts of the polymer matrix. Most preferred amounts range from 5 to 15 parts per hundred parts. It will be noted that, where the impact modifier has reactive groups, it can act as a compatibilizer as well as an impact modifier. In such instances the same compound can serve as component (b) and component (c).

Both the impact modifier and the compatibilizer can be virgin polymer or can be derived from recyclable waste.

The reinforcing filler, component (d), enhances the mechanical and heat distortion properties. Depending on its nature, it can improve strength and impact properties. In general, any reinforcing filler can be added, such as fiberglass (chopped strands, long or continuous filament), asbestos, mica, wollastonite, talc, calcium carbonate, fly ash, clay, whiskers, auto shredders, metal flakes, ceramics, and carbon filaments. A single filler or combinations can be added. An appropriate coupling agent, such as silanes or organo-titanates, will enhance reinforcement. Most preferred fillers are fiberglass, talc, wollastonite and mica. In general, the filler will comprise from about 10 to about 100 parts per hundred parts of polymer matrix. Especially where glass fiber is used as the filler constituent, an amount ranging from about 20 to about 90 parts per hundred parts of polymer matrix gives a most desirable finished product. Fillers can preferably be derived from recyclable waste.

The term "auto shredders" is understood in the art as plastic scrap derived as residue from the process of scraping junked automobiles for the recovery of metals i.e., "auto shredder residues."

Though it is desired to protect the composition against thermo-oxidative degradation, in the present invention additional amounts of stabilizer are generally not needed since the polymer matrix derived from recyclable plastics waste already contains stabilizers. The finished composition may contain from 0.05 to 0.5 pph, based on the polymer matrix. Useful stabilizers are well known in the art.

To the compositions of this invention there may additionally be added ultraviolet absorbers, lubricants, antistatic agents, coloring agents and antifungal agents, depending on the ultimate use of the extruded product. The polymer matrix may already contain one or more of these additives.

The compositions of this invention can be prepared by mixing the various components in a conventional blender, e.g., a tumble blender, a ribbon blender, or a Henschel-type mixer. Compounding can be done in machines such as a twin-screw extruder or a continuous mixer/single-screw extruder combination. Thereafter, pelletizing the extrudate strands can be done in a conventional pelletizer. The pellets thus produced can be extruded into a specific structural profile by a single-screw extruder with a profile die using appropriate downstream take-off equipment.

The selection of the appropriate operating conditions may be readily determined by those skilled in the art. Generally, processing temperatures of from 150° C. to 180° C. are used.

To control the density of the structured profile product, a foaming agent may be added to the compounded pellets, preferably in an amount of from about 0.3 to 2.0 parts per hundred parts of the total composition. However, the most preferred amount is from 0.4 to 0.6 part per hundred parts.

The present innovative technology has been developed to reprocess used plastics parts and products (which otherwise are considered as solid municipal/industrial waste) into new and different types of commercial products for residential, marine engineering, highway, parks, construction and similar industries. The products have excellent surface appearance and physical properties. When in need of replacement, the products can be further recycled using the present technology.

It will be readily understood that this invention will be a welcome contribution to ecology, wood preservation, public health, environmental protection, solid waste management and pollution control.

The present invention is further illustrated by the following examples:

EXAMPLE 1

In this example, six compositions were prepared by tumble blending the components and extrusion compounding in a ZSK53 twin-screw extruder, at a straight temperature profile of about 325° F. (162° C.). The extruded product was pelletized using a Conair strand pelletizer.

The compounds were then profile extruded using a 2½" single-screw extruder into a 2"×4" lumber-like extruded shape. In certain instances, the material was compounded with a blowing agent. The compositions and product characteristics are given below.

The Mixed Plastic I used in this experiment was a recyclable municipal and industrial plastic in ground flake form, free of papers and metals. The composition contained from 80 to 90% of polyolefin, namely, HDPE, LDPE and polypropylene, and from 10 to 20% of PVC, polyethylene terephthalate or polyamides. The ionomer used was a partial metal salt of ethylene methacrylic acid (e.g., Surlyn HP200BK from DuPont).

TABLE 1

| Components, % by wt. | Composition No. | | | | | |
|---|---|---|---|---|---|---|
| | 1 | 2 | 3 | 4 | 5 | 6 |
| Mixed Plastic I | 60 | — | 60 | — | 55 | 60 |
| High Density Polyethylene | — | 58 | — | 58 | — | — |
| Ionomer | 5 | 5 | 5 | 5 | 5 | 5 |
| Chopped Fiberglass* | 35 | 35 | 35 | 35 | 30 | 30 |
| CaCO$_3$ | — | — | — | — | 10 | 10 |
| Brown Color Conc. | — | 2 | — | 2 | — | — |

*Diameter 3.5 to 4.0 × 10$^{-4}$ in., sp. gravity 2.52–2.61 (PPG-3540)

In attempting to extrude the 2"×4" lumber, the following profile extrusion processing characteristics were noted. Compositions 1 through 4 formed a steady run of product with good melt strength at the die. There was no warpage or bending after cooling. Compositions Nos. 5 and 6 gave a stable run, a stiffer melt strength, no warpage, and uniform foaming. Generally under similar conditions a comingled polymer melt, without filler, will not have sufficient melt strength for extrusion into this type of lumberlike profile shape.

In the absence of reinforcing fillers and modifiers, the materials did not have any melt strength and could not be extruded into 2"×4" lumberlike profile.

For comparison purposes, it should be noted that typical lumber 2"×4"s have a flexural modulus of 0.7×10$^6$ and a flexural strength of about 1200. In the subject invention, values of 0.6 to 1×10$^6$ and 700 to 2000, respectively, are sought with a specific gravity ranging from 0.5 to 1.2.

Table 2 shows the physical properties of certain of the above compositions. The flexural modulus shown, using both 3-point and 4-point bending, are based on ASTM D-790. All values are in pounds per square inch.

TABLE 2

| Compound No. | Three-Point Bending | | | | Four-Point Bending | | | | Specific Gravity |
|---|---|---|---|---|---|---|---|---|---|
| | Flex. Modulus | | Flex. Strength | | Flex. Modulus | | Flex. Strength | | |
| | App. | True | App. | True | App. | True | App. | True | |
| 1 | 77,620 | | 1,277 | | 135,000 | 139,600 | 1,320 | 2,110 | 0.6 |
| 2 | 89,105 | | 1,773 | | 139,000 | 147,800 | 1,850 | 2,830 | 0.6 |
| 3 | — | | — | | 136,500 | 139,000 | 1,300 | 2,200 | — |
| 4 | 52,963 | 0.65 × 10⁶ | 1,367 | 1,523 | 111,000 | 123,000 | 1,750 | 2,460 | 0.7 |
| 6 | | | | | 139,480 | 145,600 | 1,758 | 2,720 | — |

EXAMPLE 2

In this example, additional compositions were prepared in accordance with the procedure described in Example 1. Table 3 sets forth the compositions. The Mixed Plastic II has a composition similar to Mixed Plastic I described above, but was obtained from a different lot. The rubber powder was obtained from a metal-free tire regrind, and the maleated EPDM was a maleic anhydride grafted EPDM rubber (Uniroyal Chemical Modifier X-465). Chopped Fiberglass I is Owens-Corning fiberglass waste regrind.

TABLE 3

| Components, % by wt. | Composition No. | | | |
|---|---|---|---|---|
| | 8 | 9 | 10 | 11 |
| Mixed Plastic I | 53 | — | — | — |
| Mixed Plastic II | — | 50 | 45 | 35 |
| Ionomer | 10 | — | — | — |
| Rubber Powder | 5 | 15 | 10 | 10 |
| Chopped Fiberglass I | 30 | 30 | 40 | 50 |
| Mixed Eng. Plastics | — | — | — | — |
| Maleated EPDM | — | 5 | 5 | 5 |
| Green Color Conc. | 2 | — | — | — |

The physical properties of molded ASTM bars of Compositions Nos. 9, 10 and 11 are shown in the following Table.

TABLE 4

Physical Properties of Molded ASTM Bars

| Property | ASTM Test Method | Units | Value Compound # | | |
|---|---|---|---|---|---|
| | | | 9 | 10 | 11 |
| Mechanical: | | | | | |
| Tensile Strength at Yield | D-638 | psi | 3,484 | 3,882 | 3,755 |
| Ultimate Elongation | D-638 | % | 1.7 | 1.03 | 0.92 |
| Flexural Strength | D-790 | psi | 5,607 | 6,253 | 6,490 |
| Flexural Modulus | D-790 | psi × 10⁶ | 0.49 | 0.61 | 0.78 |
| Notched Izod Impact | D-256 | ft-lb/in | 1.06 | 0.97 | 0.89 |
| Rockwell Hardness | D-785 | R-scale | R11-R9 | R9-R28 | R8-R30 |
| Thermal: | | | | | |
| Heat Distortion Temperature at 264 psi | D-648 | °F. | 183 | 179 | 192 |
| Rheology: | | | | | |
| Melt Flow Rate | D-1238 | gm/10 min. | 0.0112-0.0776 | 0.0088-0.0696 | 0.0066-0.068 |
| Mold Shrinkage | | in/in | | | |

These products have superior properties as compared to prime HDPE, large diameter irrigation pipe grade. For comparison, it should be observed that unreinforced pipe extrusion grade HDPE has a tensile strength of from 2800–3300, an ultimate elongation of \~30, a flexural modulus of 0.16–0.14, a notched Izod of 5, a Rockwell Hardness of D-64, a heat distortion of 108, a melt flow rate of 0.95 and a mold shrinkage of 0.020.

EXAMPLE 3

In this example, certain of the compositions described in Tables 1 and 3 were extruded into lumber like 2″×4″ products and various physical properties ascertained.

TABLE 5

Tensile Properties of Various Extruded Lumber-Like (2″ × 4″) Products

| Compound | Density (lb/ft³) | Tensile Strength at Break (psi) | Percentage Elongation | Modulus of Elasticity (psi) |
|---|---|---|---|---|
| #1 | 48.73 | 1,153 | 2.58 | 1.27 (10)⁵ |
| #2 | 50.91 | 1,242 | 2.98 | 1.32 (10)⁵ |
| #3 | 46.73 | 1,539 | 2.80 | 1.47 (10)⁵ |
| #4 | 46.10 | 1,898 | 3.24 | 1.37 (10)⁵ |
| #8 | 49.26 | 1,587 | 2.38 | 1.83 (10)⁵ |
| #9 | 49.92 | | 1.67 | 1.13 (10)⁵ |
| #10 | 50.77 | 1,080 | 1.49 | 1.60 (10)⁵ |
| Typical woods | 22–76 | | | 1.5–11 (10)⁵ |

TABLE 6

Compression Properties of Various Extruded Lumber-Like (2″ × 4″) Products

| Compound | Parallel to Width | | | Parallel to Axis |
|---|---|---|---|---|
| | Strength (psi) | Modulus (psi) | Percentage of Deformation | Modulus of Elasticity (psi) |
| #1 | 1,552 | 45,257 | 13.5 | 90,701 |

TABLE 6-continued

Compression Properties of Various Extruded Lumber-Like (2" × 4") Products

| Compound | Parallel to Width | | | Parallel to Axis |
| --- | --- | --- | --- | --- |
| | Strength (psi) | Modulus (psi) | Percentage of Deformation | Modulus of Elasticity (psi) |
| #3 | 1,449 | 30,478 | 61.9 | 93,701 |
| #8 | 2,062 | 62,042 | 45.7 | 103,226 |
| #9 | 1,297 | 47,873 | 48.5 | 55,036 |

Typical pine 700–1500

TABLE 7

Flexural Properties of Various Extruded Lumber-Like (2" × 4") Products

| Compound | Flexural Modulus Apparent (psi) | Flexural Strength Apparent (psi) |
| --- | --- | --- |
| #1 | $1.26 (10)^5$ | 3,910 |
| #2 | $1.22 (10)^5$ | 3,750 |
| #3 | $1.46 (10)^5$ | 4,200 |
| #4 | $1.37 (10)^5$ | 3,938 |
| #8 | $1.43 (10)^5$ | 4,100 |
| #9 | $8.49 (10)^5$ | 2,200 |
| #10 | $8.79 (10)^5$ | 2,280 |

Typical pine $14.0 (10)^5$ (True)

These data show that the products of the invention are either equivalent to or better than typical pine. The products have good surface texture and dimensional stability.

The foregoing disclosure and examples of the invention are intended merely to be illustrative and explanatory thereof. Various changes may obviously be made without departing from the scope of the invention which is defined in the following claims.

We claim:

1. A mixed plastic composition which is extrudable through a profile die into a structural article which comprises: (A) a polymer matrix having 100 parts of a first component having not less than 80% by weight of a waste polyethylene material and from 5 to 25 pph of a second component containing reactive groups and selected from at least one of ethylene-propylene-maleic anhydride copolymers, styrene-maleic anhydride copolymers, ethylene-methyl acrylate copolymers, ethylene-ethyl acrylate copolymers, ethylene-acrylic acid copolymers, ethylene-vinyl acetate copolymers, ethylene-ethyl acrylate-methacrylic acid terpolymers, partial metal salts of ethylene-methacrylic acid and maleic anhydride grafter EPDM rubbers; (B) from 10 to 100 pph of fiberglass as a reinforcing filler, with or without a coupling agent; and (C) from 0.3 to 2 pph of a foaming agent, such composition after extrusion having a specific gravity in the range of 0.5 to 1.2 and a flexural strength of from 700 to 2000 psi.

2. The mixed plastic composition of claim 1 wherein the second component is an ethylene-acrylic acid copolymer.

3. The mixed plastic composition of claim 1 wherein the foaming agent is present in an amount of from 0.4 to 2.0 pph.

4. The mixed plastic composition of claim 1 wherein there is also present a reinforcing filler selected from the group of asbestos, mica, wollastonite, talc, calcium carbonate, fly ash, clay, whiskers, auto shredder residues, metal flakes, and carbon filaments.

5. The mixed plastic composition of claim 1 wherein calcium carbonate is present as an additional reinforcing filler.

6. A structural article of a mixed plastic material which has been formed by extrusion through a profile die which comprises: (A) a polymer matrix having a first component having not less than 80% by weight of a waste polyethylene material and from 5 to 25 pph of a second component containing reactive groups and selected from at least one of ethylene-propylene-maleic anhydride copolymers, styrene-maleic anhydride copolymers, ethylene-methyl acrylate copolymers, ethylene-ethyl acrylate copolymers, ethylene-acrylic acid copolymers, ethylene-vinyl acetate copolymers, ethylene-ethyl acrylate-methacrylic acid terpolymers, partial metal salts of ethylene-methacrylic acid and maleic anhydride grafted EPDM rubbers; (B) from 10 to 100 pph of fiberglass as a reinforcing filler, with or without a coupling agent; and (C) from 0.3 to 2 pph of a foaming agent, having a specific gravity in the range of 0.5 to 1.2 and a flexural strength of from 700 to 2000 psi.

7. The structural article of claim 6 wherein the second component is an ethylene-acrylic acid copolymer.

8. The structural article of claim 6 wherein the blowing agent is present ian an amount of from 0.4 to 0.6 pph.

9. The structural article of claim 6 wherein there is also present a filler selected from the group of asbestos, mica, wollastonite, talc, calcium carbonate, fly ash, clay, whiskers, auto shredder residues, metal flakes, and carbon filaments.

10. The structural shape of claim 6 wherein calcium carbonate is present as an additional reinforcing filler.

11. The composition of claim 1 wherein the polyethylene material is HDPE, LDPE, LLDPE, or UHMWPE.

12. The composition of claim 6 wherein the polyethylene material is HDPE, LDPE, LLDPE or UHMWPE.

* * * * *